(12) United States Patent
Pascall et al.

(10) Patent No.: US 10,207,317 B2
(45) Date of Patent: *Feb. 19, 2019

(54) ADDITIVE MANUFACTURING OF SEMI-SOLID METAL ALLOYS USING ULTRASONIC AGITATION

(71) Applicant: LAWRENCE LIVERMORE NATIONAL SECURITY, LLC, Livermore, CA (US)

(72) Inventors: Andrew J. Pascall, Livermore, CA (US); Eric B. Duoss, Dublin, CA (US); Ryan M. Hunt, Aix-en-Provence (FR); Joshua Kuntz, Livermore, CA (US); Christopher M. Spadaccini, Oakland, CA (US); John Vericella, Oakland, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 415 days.

This patent is subject to a terminal disclaimer.

(21) Appl. No.: 15/001,491

(22) Filed: Jan. 20, 2016

(65) Prior Publication Data

US 2017/0203357 A1 Jul. 20, 2017

(51) Int. Cl.
*B22D 11/114* (2006.01)
*B22D 11/01* (2006.01)
*B33Y 10/00* (2015.01)
*B33Y 30/00* (2015.01)
*B22F 3/105* (2006.01)

(52) U.S. Cl.
CPC ............ *B22D 11/114* (2013.01); *B22D 11/01* (2013.01); *B22F 3/1055* (2013.01); *B33Y 10/00* (2014.12); *B33Y 30/00* (2014.12)

(58) Field of Classification Search
None
See application file for complete search history.

(56) References Cited

U.S. PATENT DOCUMENTS

| | | | |
|---|---|---|---|
| 6,383,301 B1 * | 5/2002 | Bell | B01J 8/0015 |
| | | | 118/716 |
| 2014/0354744 A1 * | 12/2014 | Ohnishi | B41J 2/01 |
| | | | 347/102 |
| 2017/0056970 A1 * | 3/2017 | Chin | B33Y 30/00 |

OTHER PUBLICATIONS

Rice et al., "Metal Solid Freeform Fabrication Using Semi-Solid Slurries," JOM, 2000, pp. 31-33.

* cited by examiner

*Primary Examiner* — Shamim Ahmed
*Assistant Examiner* — Bradford M Gates
(74) *Attorney, Agent, or Firm* — Eddie E. Scott

(57) ABSTRACT

Apparatus, systems, and methods that ultrasonically agitate a semisolid metal slurry to prevent dendrite formation that can lead to clogging of a nozzle during direct metal writing.

15 Claims, 2 Drawing Sheets

ADDITIVE MANUFACTURING OF SEMI-SOLID METAL ALLOYS USING ULTRASONIC AGITATION

STATEMENT AS TO RIGHTS TO APPLICATIONS MADE UNDER FEDERALLY SPONSORED RESEARCH AND DEVELOPMENT

The United States Government has rights in this application pursuant to Contract No. DE-AC52-07NA27344 between the United States Department of Energy and Lawrence Livermore National Security, LLC for the operation of Lawrence Livermore National Laboratory.

BACKGROUND

Field of Endeavor

The present application relates to additive manufacturing and more particularly to additive manufacturing of semi-solid metal alloys using ultrasonic agitation.

State of Technology

This section provides background information related to the present disclosure which is not necessarily prior art.

Current direct metal write systems present in literature utilize mechanical stirring to break up dendrites, which can clog the extrusion nozzle, formed in the semisolid regime. If pressure used to extrude the semisolid metal, this necessitates either a high temperature rotary bearing that can hold pressure, a pressure containment vessel, or very long stir rod.

The disclosed apparatus, systems, and methods get around these issues by integrating an ultrasonic transducer into the semisolid flow chamber. The ultrasound energy is deposited directly into the semisolid melt and no bearings are needed. The system can be made much more compact because the resonator can be made to withstand temperature.

SUMMARY

Features and advantages of the disclosed apparatus, systems, and methods will become apparent from the following description. Applicant is providing this description, which includes drawings and examples of specific embodiments, to give a broad representation of the apparatus, systems, and methods. Various changes and modifications within the spirit and scope of the application will become apparent to those skilled in the art from this description and by practice of the apparatus, systems, and methods. The scope of the apparatus, systems, and methods is not intended to be limited to the particular forms disclosed and the application covers all modifications, equivalents, and alternatives falling within the spirit and scope of the apparatus, systems, and methods as defined by the claims.

The inventor's provide apparatus, systems, and methods to ultrasonically agitate a semisolid metal slurry to prevent dendrite formation that can lead to clogging of a nozzle during direct metal writing. Ultrasound is a much more straightforward method of agitation as opposed to direct mechanical stirring because it is easy to apply an overpressure to the system while eliminating the need for a rotary bearing. The inventor's apparatus, systems, and methods have use in additively manufacturing to produce metal parts.

The apparatus, systems, and methods are susceptible to modifications and alternative forms. Specific embodiments are shown by way of example. It is to be understood that the apparatus, systems, and methods are not limited to the particular forms disclosed. The apparatus, systems, and methods cover all modifications, equivalents, and alternatives falling within the spirit and scope of the application as defined by the claims.

BRIEF DESCRIPTION OF THE DRAWINGS

The accompanying drawings, which are incorporated into and constitute a part of the specification, illustrate specific embodiments of the apparatus, systems, and methods and, together with the general description given above, and the detailed description of the specific embodiments, serve to explain the principles of the apparatus, systems, and methods.

DETAILED DESCRIPTION OF SPECIFIC EMBODIMENTS

Figure 1:
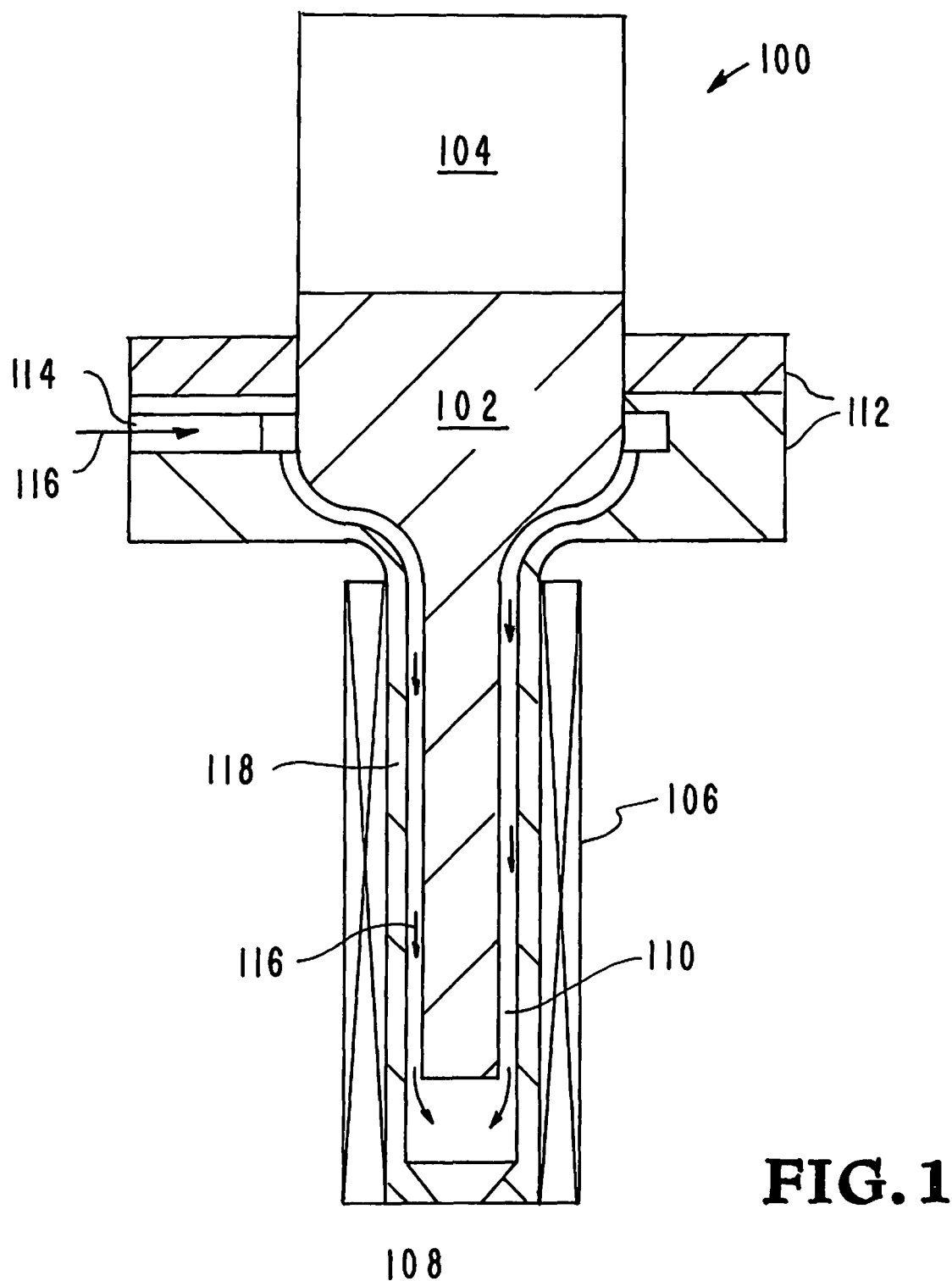
FIG. 1 illustrate and embodiments of a print head with ultrasonic agitation.

Referring to the drawings, to the following detailed description, and to incorporated materials, detailed information about the apparatus, systems, and methods is provided including the description of specific embodiments. The detailed description serves to explain the principles of the apparatus, systems, and methods. The apparatus, systems, and methods are susceptible to modifications and alternative forms. The application is not limited to the particular forms disclosed. The application covers all modifications, equivalents, and alternatives falling within the spirit and scope of the apparatus, systems, and methods as defined by the claims.

The inventor's apparatus, systems, and methods provide additive manufacturing to form a printed pattern of the product being produced. The apparatus, systems, and methods operate to produce the product by sequentially layering one material on top of another in a desired pattern. Movement of the substrate and/or print head is controlled by a computer controller which provides freedom of movement along all axes. Instruction information regarding the product is created and fed to the computer controller. The computer controller uses the instructions to move the substrate and/or the print head through a series of moments forming the product. The individual layers can be tailored to be made of a predetermined formula of material. The print head uses a nozzle for extruding the filament of the metal or alloy. The inventor's apparatus, systems, and methods ultrasonically agitates the metal or alloy material to prevent dendrite formation that can lead to clogging of the nozzle during direct metal writing.

Referring now to the drawings and in particular to FIG. 1, an embodiment of the inventors' additive manufacturing print head is illustrated. The print head is designated generally by the reference numeral 100. The print head 100 illustrated in FIG. 1 includes the components identified and described below.

Sonic horn 102.
Transducer 104.
Heater system 106.
Nozzle 108.
Fluid gap 110.
Flanges 112.
Port for build material 114.
Flow arrows 116.
Thin wall for thermal control 118.

The print head 100 has a cylindrical body and a nozzle 108. A build material port 114 allows the build material to flow to and through the nozzle as indicated by the arrows 116. A build material chamber heating element 106 maintains the build material at the desired temperature. A thin wall 118 is used for temperature control.

The build material moves down the body of the print head 100 to nozzle 108. The heater system 106 maintains the build material flowing to the nozzle at the desired temperature. The sonic horn and transducer 104 ultrasonically agitates the metal or alloy material to prevent dendrite formation that can lead to clogging of the nozzle 108 during direct metal writing. The print head 100 extrudes the AM material filament of metal or alloys from the nozzle 108 of the print head 100 to form a printed pattern forming the product being produced.

Figure 2:
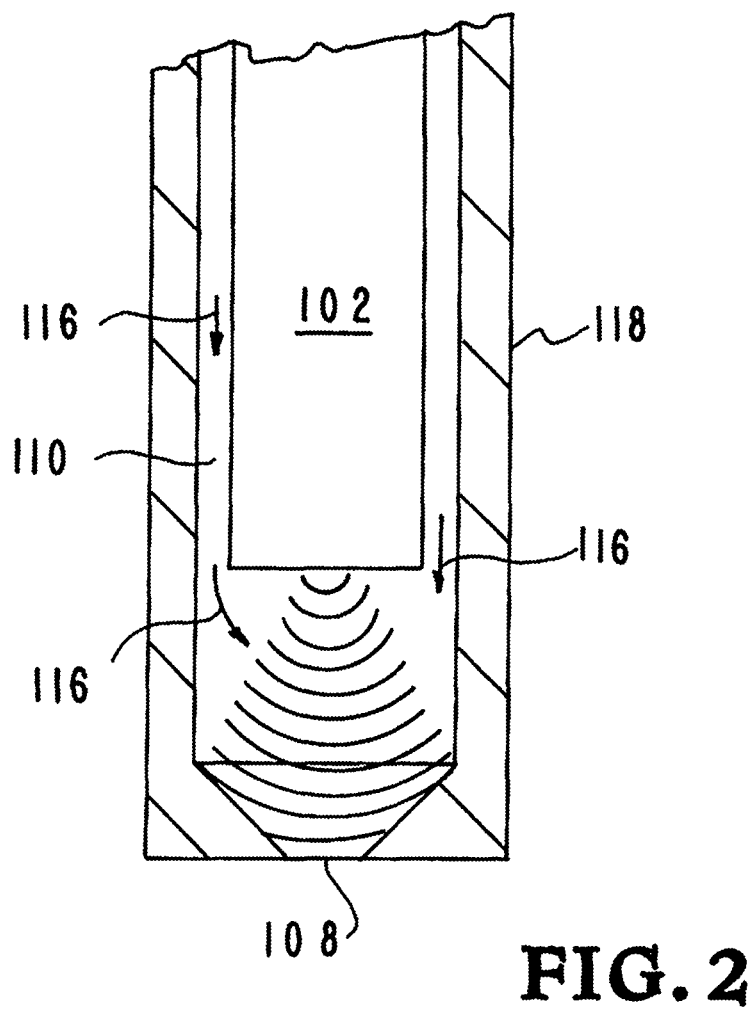
FIG. 2 is an illustration showing greater details of print head with ultrasonic agitation shown in FIG. 1.

Referring now to FIG. 2, a pictorial view further illustrates the inventors' additive manufacturing print head. The sonic horn 102 produces ultrasound waves that agitate the build material flowing in the 1 mm fluid gap 110 as it flows to and through the nozzle 108. The sonic horn serves to ultrasonically agitate the metal or alloy material to prevent dendrite formation that can lead to clogging of the nozzle 108 during direct metal writing. The print head 100 extrudes the AM material stream of metal or alloys from the nozzle 108 of the print head 100 to form a printed pattern forming the product being produced.

Although the description above contains many details and specifics, these should not be construed as limiting the scope of the application but as merely providing illustrations of some of the presently preferred embodiments of the apparatus, systems, and methods. Other implementations, enhancements and variations can be made based on what is described and illustrated in this patent document. The features of the embodiments described herein may be combined in all possible combinations of methods, apparatus, modules, systems, and computer program products. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination. Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described above should not be understood as requiring such separation in all embodiments.

Therefore, it will be appreciated that the scope of the present application fully encompasses other embodiments which may become obvious to those skilled in the art. In the claims, reference to an element in the singular is not intended to mean "one and only one" unless explicitly so stated, but rather "one or more." All structural and functional equivalents to the elements of the above-described preferred embodiment that are known to those of ordinary skill in the art are expressly incorporated herein by reference and are intended to be encompassed by the present claims. Moreover, it is not necessary for a device to address each and every problem sought to be solved by the present apparatus, systems, and methods, for it to be encompassed by the present claims. Furthermore, no element or component in the present disclosure is intended to be dedicated to the public regardless of whether the element or component is explicitly recited in the claims. No claim element herein is to be construed under the provisions of 35 U.S.C. 112, sixth paragraph, unless the element is expressly recited using the phrase "means for."

While the apparatus, systems, and methods may be susceptible to various modifications and alternative forms, specific embodiments have been shown by way of example in the drawings and have been described in detail herein. However, it should be understood that the application is not intended to be limited to the particular forms disclosed. Rather, the application is to cover all modifications, equivalents, and alternatives falling within the spirit and scope of the application as defined by the following appended claims.

The invention claimed is:

1. An additive manufacturing apparatus for producing a product, comprising:
    an additive manufacturing print head, said additive manufacturing print head having a length;
    a metal build material;
    a port in said additive manufacturing print head for allowing said build material to flow through said additive manufacturing print head;
    a nozzle in said additive manufacturing print head, said nozzle adapted to receive said metal build material and adapted for extruding said metal build material;
    a wall adjacent said nozzle;
    a fluid gap between said wall and said nozzle, wherein said fluid gap receives said metal build material from said port;
    a heater system adjacent said nozzle for heating said metal build material;
    an ultrasonic agitation system for agitating said metal build material in said fluid gap, wherein said ultrasonic agitation system does not extend said length of said additive manufacturing print head;
    a substrate; and
    a system for producing relative movement between said additive manufacturing print head and said substrate to form the product.

2. The additive manufacturing apparatus for producing a product of claim 1 wherein said system for producing relative movement between said additive manufacturing print head and said substrate to form the product is a computer controller containing instructions for producing the product.

3. The additive manufacturing apparatus for producing a product of claim 1 wherein said metal build material in said additive manufacturing print head includes powdered metal particles.

4. The additive manufacturing apparatus for producing a product of claim 1 wherein said metal build material in said additive manufacturing print head includes metal chunks.

5. The additive manufacturing apparatus for producing a product of claim 1 wherein said metal build material in said additive manufacturing print head includes wire.

6. The additive manufacturing apparatus for producing a product of claim 1 wherein said ultrasonic agitation system for agitating said metal build material includes a sonic horn and wherein said sonic horn extends out of said additive manufacturing print head.

7. The additive manufacturing apparatus for producing a product of claim 1 wherein said ultrasonic agitation system for agitating said metal build material includes a sonic horn and a transducer, wherein said sonic horn extends out of said additive manufacturing print head and wherein said transducer is entirely outside of said additive manufacturing print head.

8. The additive manufacturing apparatus for producing a product of claim 1 further comprising a system for heating said substrate.

9. The additive manufacturing apparatus for producing a product of claim 1 further comprising additional additive manufacturing print heads.

10. An additive manufacturing method for producing a product, comprising the steps of:
providing an additive manufacturing print head that has a length;
providing a metal build material;
providing a port in said additive manufacturing print head allowing said build material to flow through said additive manufacturing print head;
providing a nozzle in said additive manufacturing print head that receives said metal build material and that extrudes said metal build material;
providing a wall adjacent said nozzle;
providing a fluid gap between said wall and said nozzle, wherein said fluid gap receives said metal build material from said port;
providing a heater system adjacent said nozzle for heating said metal build material;
providing an agitation system in said fluid gap, wherein said agitation system does not extend said length of said additive manufacturing print head and wherein said agitation system is used for agitating said metal build material;
providing a substrate; and
providing a system for producing relative movement between said additive manufacturing print head and said substrate to form the product.

11. The additive manufacturing method for producing a product of claim 10 wherein said step of providing a system for producing relative movement between said additive manufacturing print head and said substrate to form the product comprises providing a computer controller containing instructions for producing the product.

12. The additive manufacturing method for producing a product of claim 10 wherein said step of providing an agitation system for agitating said metal build material comprises providing an ultrasonic agitation system with a sonic horn that extends out of said additive manufacturing print head and providing a transducer connected to said sonic horn wherein said transducer is entirely outside of said additive manufacturing print head.

13. The additive manufacturing method for producing a product of claim 10 wherein said step of providing a metal build material in said additive manufacturing print head comprises providing a metal build material in said additive manufacturing print head having a semi-solid consistency.

14. The additive manufacturing method for producing a product of claim 10 wherein said step of providing a metal build material in said additive manufacturing print head comprises providing a metal build material in said additive manufacturing print head having the consistency of a viscoelastic fluid.

15. The additive manufacturing method for producing a product of claim 10 wherein further comprising the step of heating said substrate.

\* \* \* \* \*